R. E. CONNOR.
MACHINE FOR TRIMMING PIPES.
APPLICATION FILED APR. 4, 1913.

1,120,134.

Patented Dec. 8, 1914.
2 SHEETS—SHEET 1.

Witnesses

Robert E. Connor,
Inventor by C. A. Snow & Co.
Attorneys

R. E. CONNOR.
MACHINE FOR TRIMMING PIPES.
APPLICATION FILED APR. 4, 1913.
1,120,134.
Patented Dec. 8, 1914.
2 SHEETS—SHEET 2.
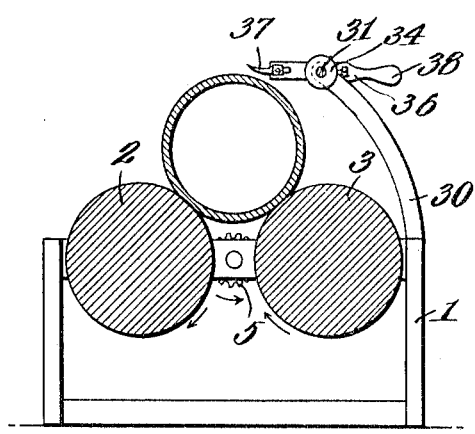
Fig. 4.
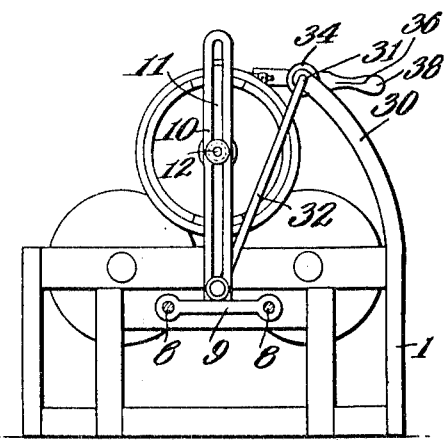
Fig. 3.
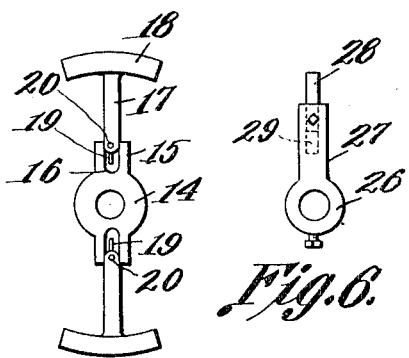
Fig. 5.
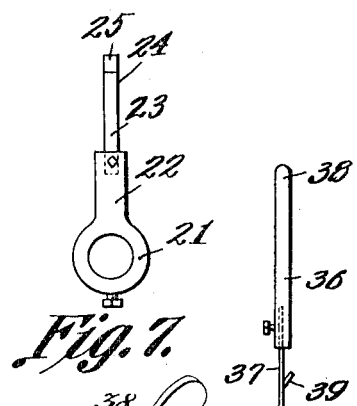
Fig. 9.
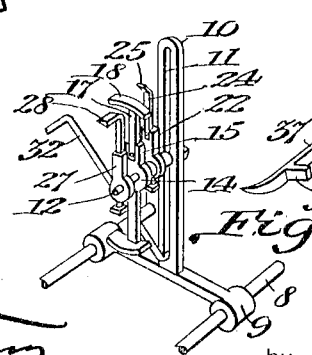
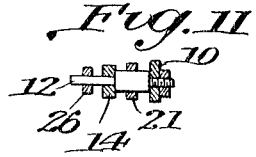
Fig. 11.
Witnesses
Robert E. Connor,
Inventor
by C. A. Snow & Co.
Attorneys

UNITED STATES PATENT OFFICE.

ROBERT EMMETT CONNOR, OF OWENSBORO, KENTUCKY.

MACHINE FOR TRIMMING PIPES.

1,120,134.  Specification of Letters Patent.  Patented Dec. 8, 1914.

Application filed April 4, 1913. Serial No. 758,901.

*To all whom it may concern:*

Be it known that I, ROBERT EMMETT CONNOR, a citizen of the United States, residing at Owensboro, in the county of Daviess and State of Kentucky, have invented a new and useful Machine for Trimming Pipes, of which the following is a specification.

This invention relates to machines for trimming pipes or tiles formed from clay and the like, one of the objects of the invention being to provide a machine of this character which is simple in construction and which is particularly designed to remove the issue formed within the bell end of the pipe during the molding thereof.

A further object is to provide a machine of this character which is adjustable readily to pipes of different sizes.

Another object is to provide improved means for rotating the pipe during the trimming operation, said means being so shaped as to enable the pipe to be easily placed in or removed from position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
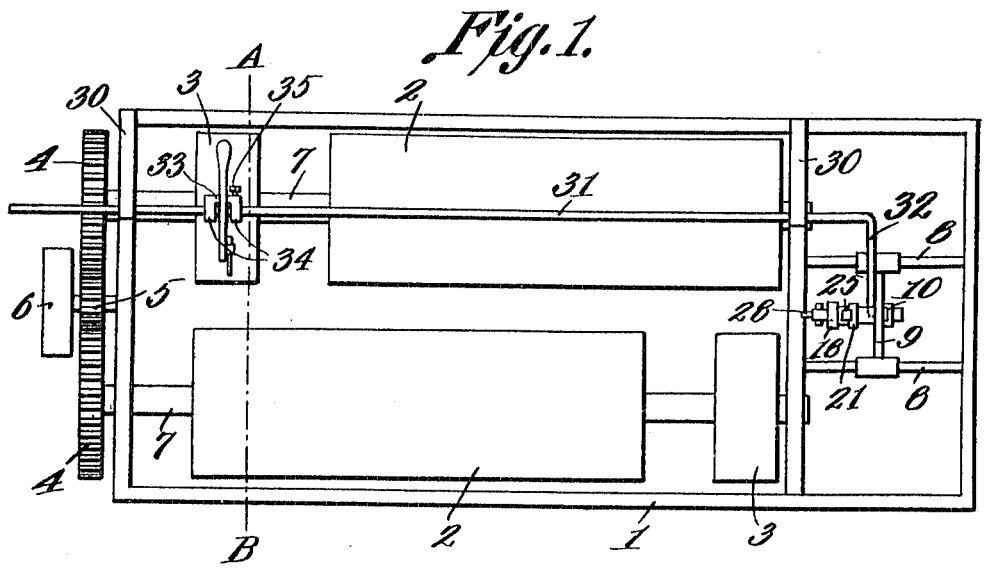
Figure 2:
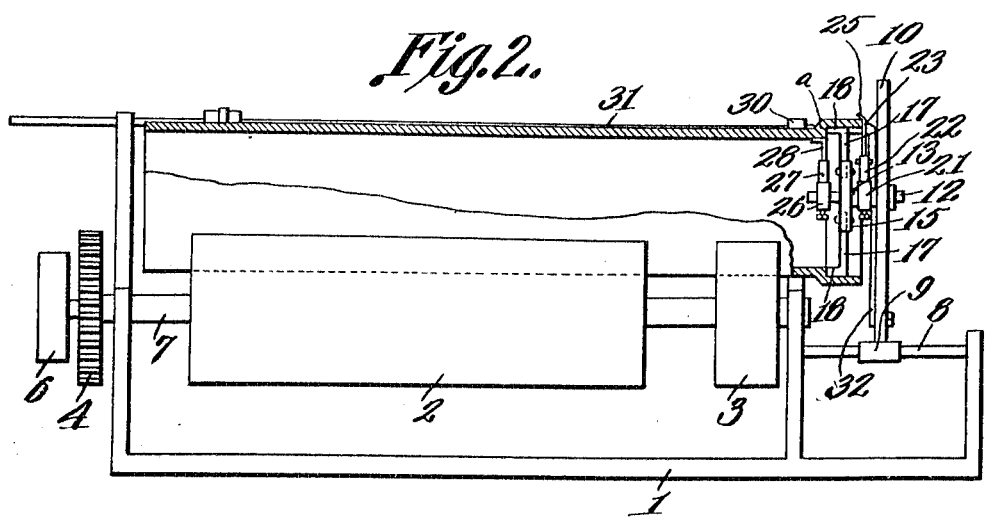

In said drawings: Figure 1 is a plan view of the machine. Fig. 2 is a side elevation thereof, a pipe being shown in position, a portion of the pipe being in section. Fig. 3 is an end elevation. Fig. 4 is a section on line A—B Fig. 1. Fig. 5 is a detail view of the adjustable stop used in connection with the bell trimmer. Fig. 6 is a detail view of the adjustable interior trimmer. Fig. 7 is a detail view of the exterior trimmer of the bell. Fig. 8 is an edge view of the means utilized for cutting off the pipe to the desired length. Fig. 9 is a perspective view of the pipe engaging and trimming elements at one end of the machine and of the supports therefor. Fig. 10 is an enlarged perspective view of the knife shown in Fig. 8. Fig. 11 is a horizontal section through a portion of the structure shown in Fig. 9 and showing the stem in plan while the parts mounted thereon are shown in section.

Referring to the figures by characters of reference 1 designates a suitable supporting frame in which are journaled two parallel shafts 7 driven by gears 4 and 5 and pulley 6. Each shaft 7 carries a long supporting roll 2 and a short supporting roll 3.

Guide rods 8 are arranged within one end of the frame and beyond the adjacent ends of the rolls and mounted on these guide rods is a cross head 9 provided with a standard 10. Said standard has a longitudinal slot 11 within which is adjustably mounted a stem 12 which is parallel with the shafts 7 and is equidistant therefrom. This stem may be secured in any desired manner so as to prevent movement thereof relative to the standard 10. The stem is reduced annularly at its free end portion so as to form a shoulder 13 and loosely mounted on this reduced portion and abutting against the shoulder is a collar 14 having diametrically opposed wings 15 each of which has a longitudinal groove 16. These grooves receive arms 17 extending in opposite directions and formed on or secured to the ends of the arms are arcuate shoes 18. The arms may be adjusted longitudinally within the wings in any suitable manner, each wing being preferably formed with a longitudinal slot 19 designed to receive a binding screw 20 which engages the arms 17. Thus it will be seen that the arcuate shoes 18 can be adjusted toward or from each other so as to fit within pipe bells of different diameters.

Secured to the stem 12 between shoulder 13 and standard 10 is a collar 21 formed with a radial arm 22 in which a shank 23 is detachably secured. This shank also extends radially from the collar and is provided with a longitudinal cutting edge 24 and also an angularly disposed cutting terminal 25. Secured to the stem 12 adjacent the free end thereof is another collar 26 which is provided with a radial arm 27 in which is detachably secured an L-shaped knife 28. This knife is adjustably mounted within a socket in arm 27 so that the knife can thus be arranged for use in connection with pipes of different sizes. Brackets 30 extend from one side of the structure 1 and slidably mounted within these brackets is a rod 31, one end of which extends downwardly as at 32 and is secured to the cross head 9. Fitted on this rod 31 is a sleeve 33 having spaced ears 34, this sleeve being adapted to be adjusted longitudinally along rod 31 and to be secured in any position to which it may be adjusted, by means of a set screw 35 or the like. Rod 31 is pivotally engaged, between the ears 34, by an intermediate portion of a lever 36 one end of which is adjustably engaged by a knife 37 while the other end of the lever constitutes a handle as shown at 38.

In using the apparatus the rod 31 is shifted longitudinally toward the right, in Figs. 1 and 2, thus bringing the cross head 9 close to one end of the structure 1. The shoes 18, blades 23 and 28 are adjusted to the size of the bell of the pipe to be trimmed and the lever 36 is adjusted longitudinally along rod 31 until the distance between its blade 37 and the cutting edge 24 is equal to the length of the pipe to be produced. After the rollers 2 and 3 are set in motion, the pipe to be trimmed is supported by placing the hands under the end portions thereof and said pipe is then lowered onto the rolls, the hands entering the spaces formed between the rolls 2 and 3. As soon as the pipe is deposited on the rolls it will begin to rotate by reason of its frictional engagement therewith. Rod 31 is then shifted longitudinally so as to move the stem 12 into the bell of the pipe, thus bringing the shoes 18 into the bell and against the shoulder therein and bringing the L-shaped knife 28 into the bell to cut off the rough protruding portion of the clay at *a* and which is known in the art as the issue, while the knife 23 is brought into position to trim the outer end of the bell, as shown in Fig. 2. It will be seen that this movement of the knives into and toward the pipe will be limited by the shoes 18 coming into contact with the shoulder in the bell. Thus the shoes 18 act as a gage. As soon as the rod has been shifted longitudinally to bring the parts in this position, the lever 36 is swung so as to bring the blade 37 against the pipe, this blade entering the pipe and cutting it off to the desired length. As shown in Fig. 8, blade 37 is preferably provided with an angularly disposed cutting wing 39 whereby, when the pipe is cut off at its small end, a slight bevel is produced. After the pipe has been trimmed, rod 31 is shifted longitudinally subsequent to the removal of knife 37 from the pipe and the parts on stem 12 are thus withdrawn from the bell. The hands of the operator are then placed into spaces between rolls 2 and 3 and the pipe lifted off of said rolls.

What is claimed is:—

1. A machine of the class described including revoluble rollers for supporting and rotating a pipe, said rollers being arranged in pairs having non-alining spaces therebetween for the reception of the hands of the operator.

2. The combination with revoluble pipe supports and a stationary guide, of a cross head slidable along lines parallel with the supported pipe, a standard movable with the cross head, an arm shiftable with the standard and slidable within the guide, a cut-off knife adjustably mounted on said standard and movable therewith, and separate means movable with the standard for engaging the interior shoulder in the bell of the supported pipe so as to rotate with said pipe and for cutting off the issue within the bell at the shoulder, respectively.

In testimony that I claim the foregoing as my own, I have hereto affixed my signature in the presence of two witnesses.

ROBERT EMMETT CONNOR.

Witnesses:
J. R. PILE,
J. D. REEVES.

Copies of this patent may be obtained for five cents each, by addressing the "Commissioner of Patents, Washington, D. C."